(12) United States Patent
Dokuni (10) Patent No.: US 8,199,361 B2
(45) Date of Patent: Jun. 12, 2012

(54) IMAGE PROCESSING APPARATUS THAT PERFORMS COLOR CALIBRATION

(75) Inventor: Kenji Dokuni, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 1048 days.

(21) Appl. No.: 12/130,776

(22) Filed: May 30, 2008

(65) Prior Publication Data

US 2008/0297844 A1      Dec. 4, 2008

(30) Foreign Application Priority Data

May 30, 2007   (JP) ................................ 2007-143661

(51) Int. Cl.
*G06F 15/00*   (2006.01)
*H04N 1/00*    (2006.01)
(52) U.S. Cl. .......................... 358/1.9; 358/406; 358/504
(58) Field of Classification Search ................... 358/1.1, 358/1.9, 500, 501, 504, 518, 400, 401, 406, 358/296
See application file for complete search history.

(56) References Cited

FOREIGN PATENT DOCUMENTS

| JP | 07-273997 | | 10/1995 |
|---|---|---|---|
| JP | 07-274016 | | 10/1995 |
| JP | 11-179969 | | 7/1999 |
| JP | 11179969 A | * | 7/1999 |
| JP | 2000-276323 | | 10/2000 |
| JP | 2005159645 A | | 6/2005 |
| JP | 2006217192 A | | 8/2006 |
| JP | 2008079225 A | | 4/2008 |

OTHER PUBLICATIONS

Japanese language office action and its English language translation for corresponding Japanese application 2007143661 lists the references above.

* cited by examiner

*Primary Examiner* — Thomas D Lee
(74) *Attorney, Agent, or Firm* — DLA Piper LLP (US)

(57) ABSTRACT

An image processing apparatus that determines, when performing color calibration, whether or not a calibration chart is usable. A scanning unit acquires image data by optically scanning an original document. A usability determining unit determines, in accordance with conditions for colors indicated by standard image data acquired by scanning the original document, whether or not the original document is usable as the calibration chart. A calibration unit performs, only when the determination is made that the original document is usable as the calibration chart, color calibration by using an image value at a predetermined position indicated by the standard image data.

16 Claims, 7 Drawing Sheets

| COLOR | LIMIT MINIMUM DENSITY VALUE | LIMIT MAXIMUM DENSITY VALUE | LIMIT DENSITY WIDTH |
|---|---|---|---|
| R | 32 | 224 | 208 |
| G | 32 | 224 | 208 |
| B | 32 | 224 | 208 |

| SAMPLE NUMBER | POSITION | STANDARD VALUE |
|---|---|---|
| 1 | (1120, 770) | (254, 1, 2) |
| 2 | (520, 770) | (253, 254, 255) |

| SAMPLE NUMBER | COMPARISON VALUE |
|---|---|
| 1 | (251, 3, 2) |
| 2 | (252, 255, 253) |

IMAGE PROCESSING APPARATUS THAT PERFORMS COLOR CALIBRATION

CROSS-REFERENCE TO RELATED APPLICATION

This application claims priority under 35 U.S.C. 119 to Japanese Patent Application No. 2007-143661, filed on May 30, 2007, which application is hereby incorporated by reference in its entirety.

BACKGROUND OF THE INVENTION

1. Field of the Invention

The present invention relates to an image processing apparatus that processes original document data acquired by optically scanning an original document.

2. Description of the Related Art

Recently, with the aim of saving space, a network multifunction peripheral has been widely used that combines copying, network scanner and network printer functions into one unit.

Such network multifunction peripherals include a scanner device. By transferring image data acquired by optically scanning an original document using the scanner device to a built-in printer device, and to terminal and printer devices that are connected through a network, the copying, network scanner and network printer functions are achieved.

In the network multifunction peripheral, it is preferable to properly perform adjustment (hereinafter, referred to as color calibration) for accurately reproducing colors (including hue and black-and-white tone) of the original document on a copy of the original document.

Color calibration is generally performed by using a standard image (referred to as a calibration chart) in which a plurality of standard colors are present. For example, specialists make a copy of the calibration chart using a machine on which color calibration is to be performed, and perform the color calibration by comparing the original and the copy thereof with the naked eye.

A technique is also well known by which color calibration can be easily and properly performed by a general user without requiring the user to compare the original and the copy thereof with the naked eye.

A conventional image forming apparatus includes a control unit that performs a color correcting operation that compares scanned data acquired by scanning with a scanner unit a standard image including a standard tone or color bar, and scanned data acquired by scanning with the scanner unit a comparison image acquired by having the former scanned data printed by a printer unit, and that determines a correction value that brings the tone or hue of the scanned data of the comparison image close to the tone or hue of the scanned data of the standard image.

With the above configuration, since the correction value is determined by the image forming apparatus, it is not necessary to compare the colors with the naked eye, and even a general user can easily and properly perform color calibration.

In color calibration, it is generally important to use a proper standard image (hereinafter, referred to as a calibration chart). For example, if a calibration chart deteriorated with time is used, accurate color calibration cannot be performed.

subtle changes in color on the calibration chart cannot be perceived with the naked eye. Whether or not the calibration chart is usable can be determined by using a measuring instrument. However, such measuring instruments are expensive and generally used by specialists.

Accordingly, there is a problem in that as color calibration becomes easy for a general user to perform using conventional techniques, there is still no method by which the general user can easily know appropriateness of the calibration chart.

SUMMARY OF THE INVENTION

In order to overcome the problems described above, the present invention provides an image processing apparatus in which the usability of a calibration chart is determined more easily than in a conventional image processing device.

The image processing device of the present invention optically scans an original document, and includes a usability determining unit that determines whether or not the original document is usable as a calibration chart, in accordance with conditions for colors indicated by standard image data acquired by scanning the original document, and a calibration unit that performs, only when the calibration chart is determined to be usable, color calibration by using image values at a predetermined position indicated by the standard image data.

In one embodiment, when a density value of a specific color indicated by the standard image data is more than or equal to a limit maximum density value at a first portion and less than or equal to a limit minimum density value at a second portion, the usability determining unit may determine that the calibration chart is usable.

In one embodiment, the usability determining unit may exclude a case in which a difference between the density value at the first portion and the density value at the second portion of the specific color indicated by the standard image data is less than a limit density width, and determine that the calibration chart is usable.

With the above configuration, since the image processing device itself determines whether or not the calibration chart is usable, expensive measuring instruments conventionally required for the determination are not necessary. As a result, even a general user can easily know if the calibration chart is usable.

Moreover, the present invention can be implemented not only as an image processing device, but also as a network multifunction peripheral including the image processing device. Further, the present invention includes a method comprising characteristic operations performed by the image processing device.

Furthermore, the present invention can be achieved as a computer program that executes the method steps of the image processing device with a computer. Such a program can be embodied and distributed through a computer-readable recording medium such as a CD-ROM and a transmission medium such as the Internet.

Since the image processing device of the present invention itself can determine whether or not the calibration chart is usable, expensive measuring instruments conventionally required for the determination are not necessary. As a result, even the general user can easily know if the calibration chart is usable.

Other features, elements, processes, steps, characteristics and advantages of the present invention will become more apparent from the following detailed description of embodiments of the present invention with reference to the attached drawings.

DETAILED DESCRIPTION OF PREFERRED EMBODIMENTS

Figure 1:
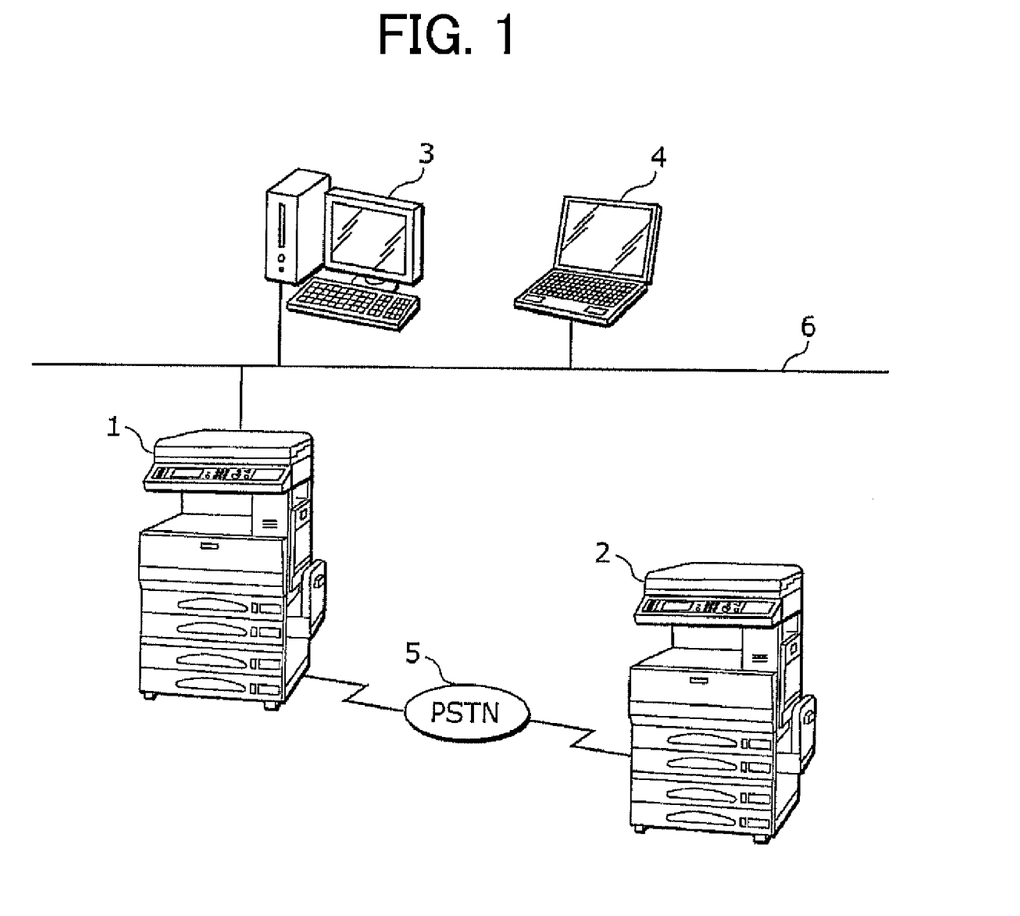
FIG. 1 illustrates an example of a configuration of a communication system including a network multifunction peripheral according to one embodiment of the invention.
Figure 2:
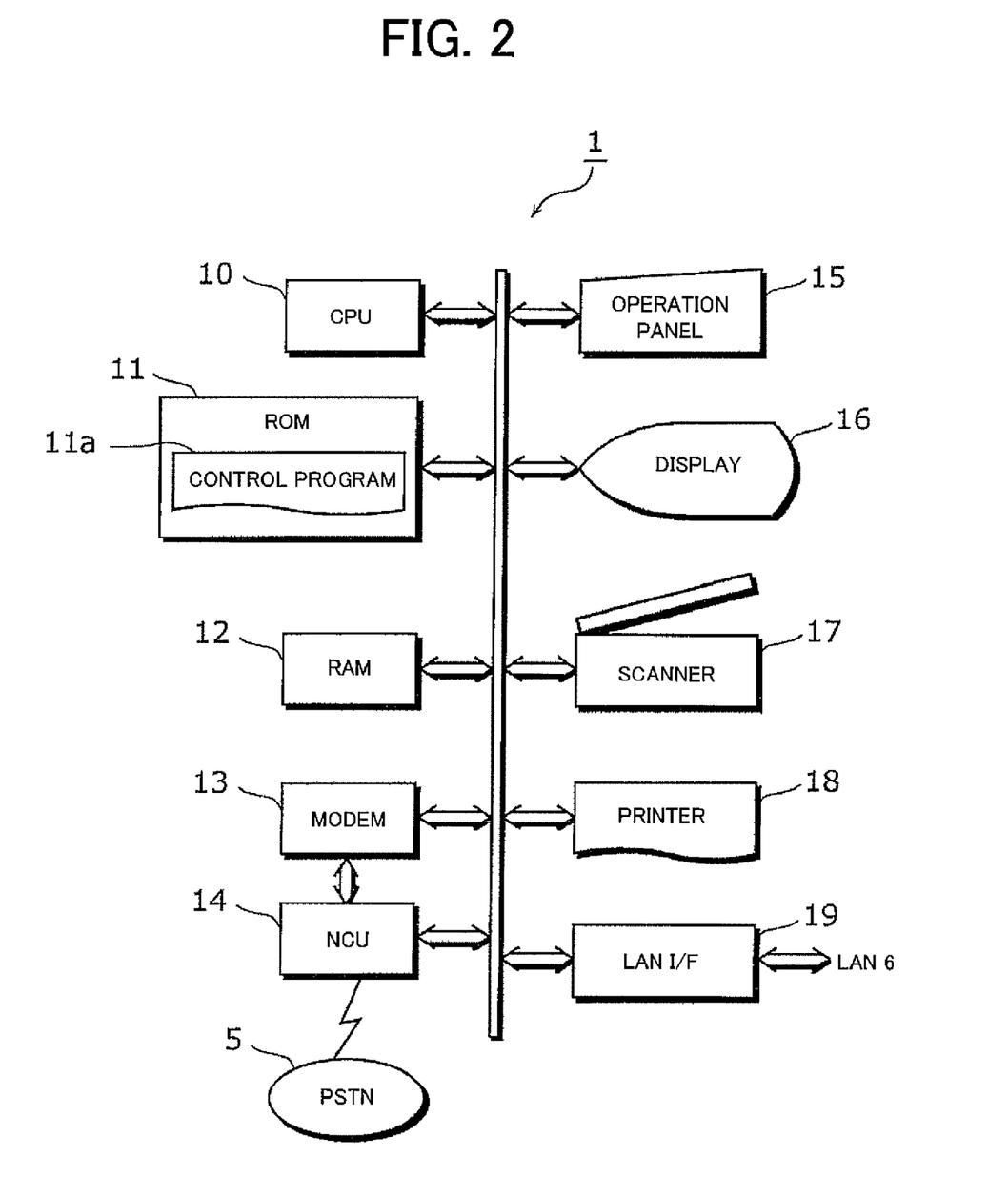
FIG. 2 is a block diagram of a hardware configuration of the network multifunction peripheral of FIG. 1.
Figure 3:
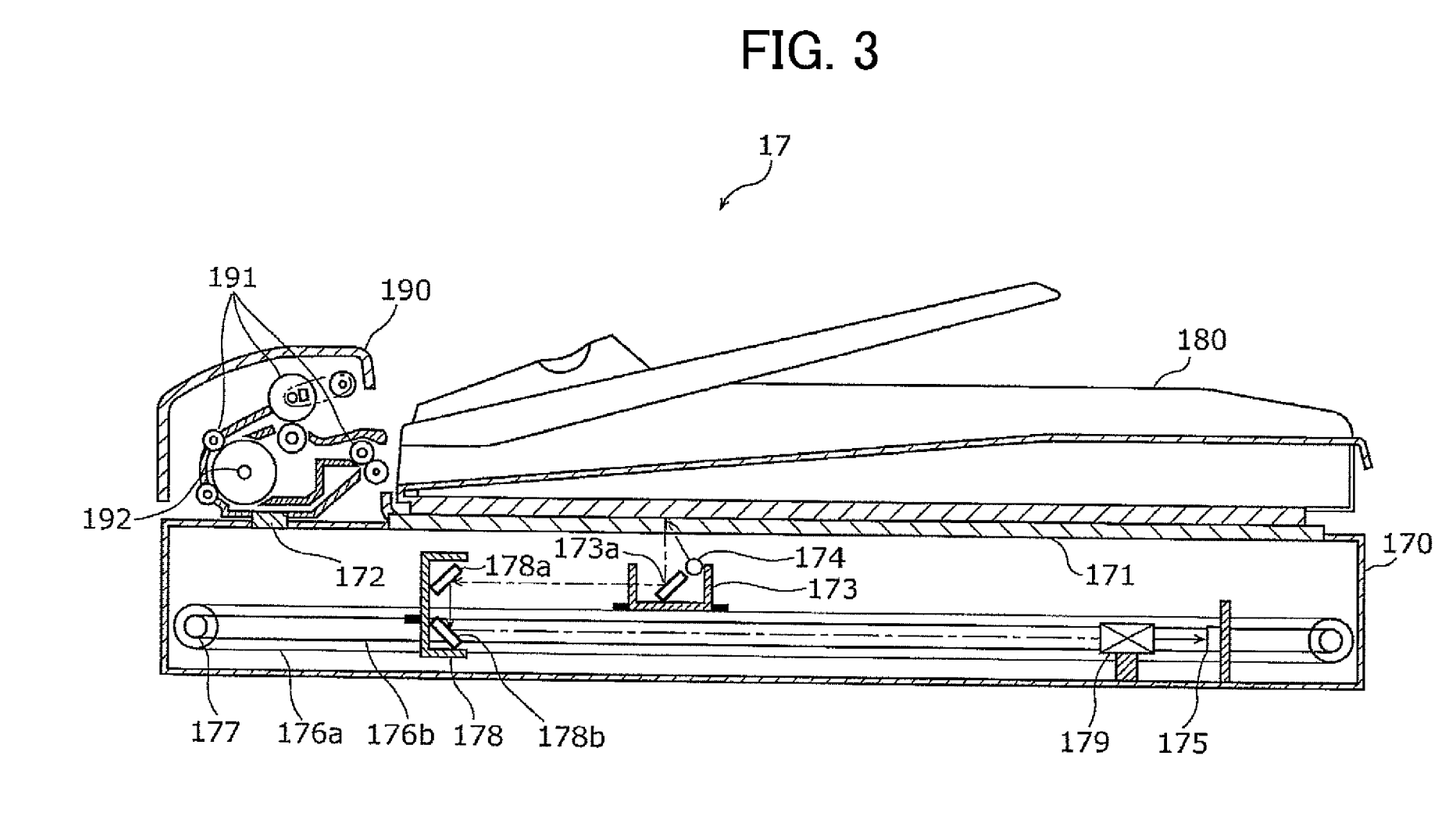
FIG. 3 is a sectional view of a main portion of a scanner device of the network multifunction peripheral of FIG. 1.

An embodiment of the present invention is now described with reference to the drawings. With reference to FIGS. 1-3, a configuration of a network multifunction peripheral including an image processing device according to an embodiment of the present invention is described.

FIG. 1 illustrates an example of a configuration of a communication system including a network multifunction peripheral according to an embodiment of the invention.

The communication system includes network multifunction peripherals 1, 2, terminal devices 3, 4, a Public Switched Telephone Network (PSTN) 5, and a Local Area Network (LAN) 6.

The network multifunction peripheral 1 is an example of a network multifunction peripheral including an image processing device according to an embodiment of the invention. The network multifunction peripheral 1 is connected to the network multifunction peripheral 2 through the PSTN 5, and is also connected to the terminal devices 3, 4 through the LAN 6.

The network multifunction peripheral 1 can transmit by facsimile an original document scanned by a scanner device, for example, to the network multifunction peripheral 2 through the PSTN 5, and to the terminal devices 3, 4 through the LAN 6. Moreover, the network multifunction peripheral 1 can perform printing by using a built-in printer device.

FIG. 2 is a block diagram of a hardware configuration of the network multifunction peripheral 1. As illustrated in FIG. 2, the network multifunction peripheral 1 includes a Central Processing Unit (CPU) 10, a Read Only Memory (ROM) 11, a Random Access Memory (RAM) 12, a modem 13, a Network Control Unit (NCU) 14, an operation panel 15, a display 16, a scanner device 17, a printer device 18, and a LAN interface (LAN I/F) 19.

The CPU 10 controls the entire network multifunction peripheral 1 by executing a control program 11a stored in the ROM 11.

The CPU 10 determines, as a characteristic process, whether or not the original document scanned by the scanner device 17 can be used (is usable) as a calibration chart. The details of the process are described later with reference to FIG. 6 etc.

The ROM 11 is a read only memory that stores the control program 11a executed by the CPU 10.

The RAM 12 is a readable and writable memory that stores work data used when the CPU 10 executes the control program 11a and image data or the like acquired from the scanner device 17.

The modem 13 modulates original document data or the like stored in the RAM 12 into a facsimile signal for transmission, and demodulates a facsimile signal received from outside into line data. The modem 13 is a facsimile modem complying with, for example, a Group 3 (G3) standard.

The NCU 14 is a network control unit that controls a connection of the modem 13 with the PSTN 5. The operation panel 15 is a touch screen that receives operations from a user.

The display 16 displays an operation guide for the user and operation status of the network multifunction peripheral 1, and includes, for example, a Liquid Crystal Display (LCD).

The scanner device 17 is an image scanning device that generates original document data by optically scanning an original document with a Charge Coupled Device (CCD) under the control of the CPU 10.

The printer device 18 prints out an original document image indicated by the original document data stored in the RAM 12, for example, under the control of the CPU 10.

The LAN I/F 19 is a communication adapter that connects the network multifunction peripheral 1 with the LAN 6, and transmits the image data stored in the RAM 12, for example, to the terminal device 3 or the like under the control of the CPU 10.

FIG. 3 is a sectional view of a main portion of the scanner device 17. With reference to FIG. 3, a hardware configuration of the scanner device 17 is described.

The scanner device 17 scans an original document by using a flatbed scanning system and an Automatic Document Feeding system, and includes a scanning mechanism unit 170, an original document placing unit 180, and an original document feeding unit 190.

The scanning mechanism unit 170 includes a contact (platen) glass 171, a slit glass 172, a full rate carriage 173, a half rate carriage 178, a condenser lens unit 179, a CCD 175, a drive belt 176a, a drive belt 176b, and a moving motor 177.

The full rate carriage 173 includes a light source 174 and a first mirror 173a arranged therein, and is attached to the drive belt 176a driven by the moving motor 177. Thus, the full rate carriage 173 is moved in a lateral direction in the drawing.

The half rate carriage 178 includes a second mirror 178a and a third mirror 178b arranged therein at a right angle with respect to each other, and is attached to the drive belt 176b driven by the moving motor 177.

The drive belts 176a and 176b are wound around respective drive pulleys that have a common axis and a radius ratio of 2:1. The belts 176a and 176b are driven by the same moving motor 177.

Accordingly, the full rate carriage 173 attached to the drive belt 176a and the half rate carriage 178 attached to the drive belt 176b are moved back and forth as if following each other at a speed ratio of 2:1 by rotary drive of the moving motor 177.

The condenser lens unit 179 and the CCD 175 are fixed to a housing of the scanning mechanism unit 170.

The original document placing unit 180 is attached to the scanning mechanism unit 170 such that the unit 180 can be pivotally opened and closed. The original document feeding unit 190 includes feeding rollers 191 and a feeding motor 192. The feeding rollers 191 form an original document path that goes through the slit glass 172, and transports the original document along the path in accordance with an operation of the feeding motor 192.

With the above configuration, when scanning the original document using the flatbed scanning system, the original document is pressed and held still on the contact glass 171 by the original document placing unit 180, which functions as a press cover. Then, by the rotary drive of the moving motor 177, the full rate carriage 173 and the half rate carriage 178, both waiting on a left side portion inside the housing of the scanning mechanism unit 170, are moved towards the right.

While the carriages 173 and 178 are moved, reflected light, which is irradiated from the light source 174 and reflected by the original document, is reflected by the first mirror 173a, the second mirror 178a, and the third mirror 178b in this order, and through the condenser lens unit 179, enters into the CCD 175 for forming an image.

When scanning the original document using the Automatic Document Feeding system, after the full rate carriage 173 is stopped under the slit glass 172, the original document feeding unit 190 picks up the original document from the original document placing unit 180 to transport the original document along the path.

While the original document is transported, reflected light, which is irradiated from the light source 174 and reflected by the original document through the slit glass 172, is reflected by the first mirror 173a, the second mirror 178a, and the third mirror 178b in this order, and through the condenser lens unit 179, enters into the CCD 175 for forming an image.

In either system, light information formed into the image is converted into a digital electric signal in the CCD 175 and output. Thus, original document data on the original document is generated.

Scanner device 17 is not limited to the above-described configuration. For example, a configuration may be adopted in which reflected light from an original document is directly captured by a CCD when a carriage having a light source and the CCD arranged thereon travels under the original document.

The configuration of the network multifunction peripheral 1 has been briefly described. Next, with reference to FIGS. 4-9, a functional configuration and operations of an image processing device according to an embodiment of the invention are described.

Figure 4:
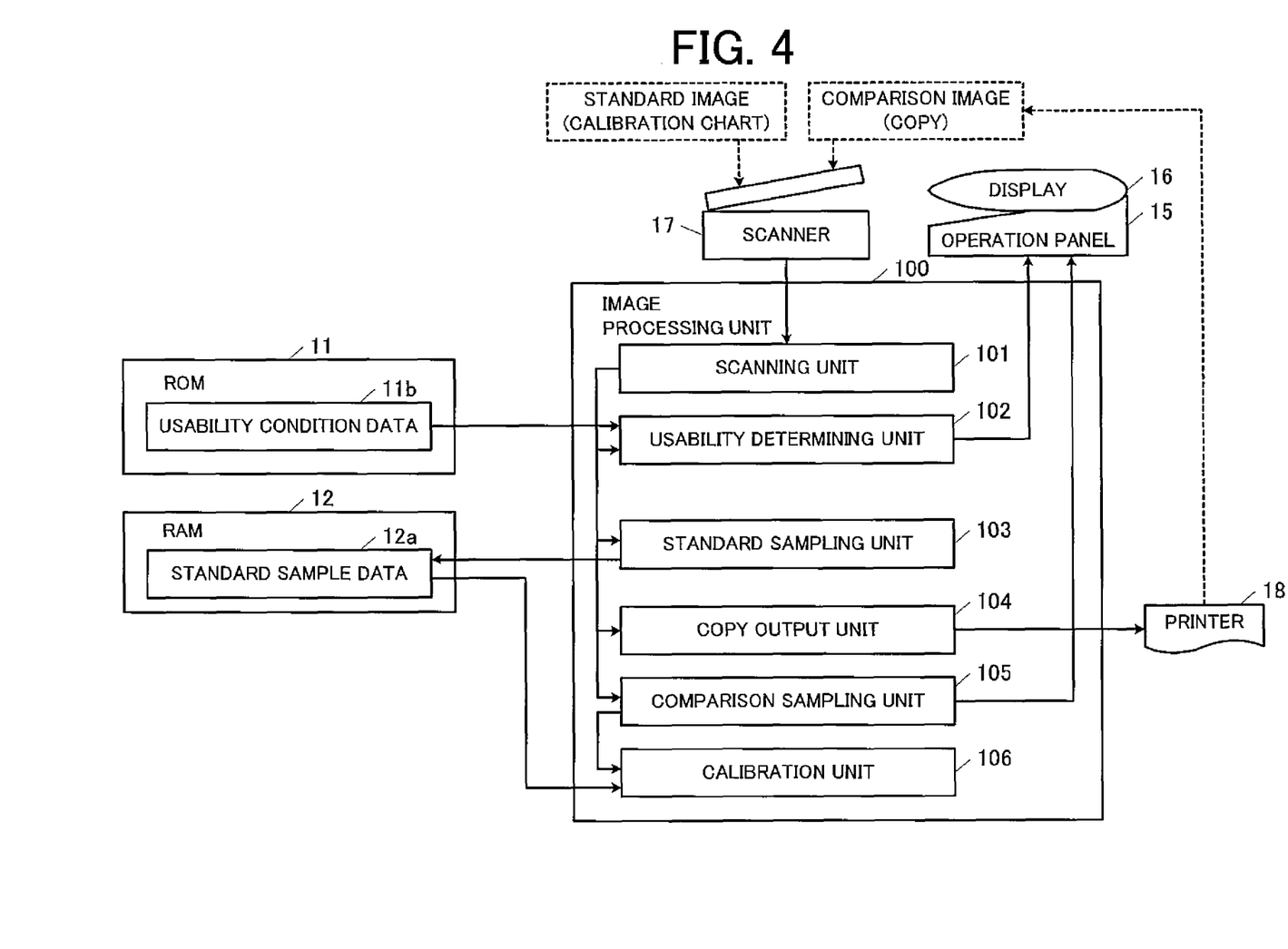
FIG. 4 is a block diagram of a characteristic functional configuration of an image processing unit according to an embodiment of the invention.

FIG. 4 is a block diagram of a characteristic functional configuration of the image processing device according to the embodiment of the invention. In FIG. 4, functions that relate to the image processing device and that are of the functions of the network multifunction peripheral 1 achieved by the hardware configuration illustrated in FIG. 2 are mainly illustrated as an image processing unit 100. In other words, the image processing unit 100 is an example of the image processing apparatus.

The image processing unit 100 of FIG. 4 includes a scanning unit 101, a usability determining unit 102, a standard sampling unit 103, a copy output unit 104, a comparison sampling unit 105, and a calibration unit 106.

The scanning unit 101 generates image data by optically scanning an original document with the scanner device 17. In this embodiment, the scanning unit 101 first scans the calibration chart to generate standard image data, and then scans a copy of the calibration chart that is then output from the printer device 18, to generate comparison image data.

The calibration chart is described in detail later with reference to FIG. 5. The usability determining unit 102 determines, in accordance with conditions for colors indicated by the standard image data, whether or not the scanned calibration chart is usable.

As an example, a portion on which a specific color is indicated with a maximum density on the calibration chart is referred to as a first portion, and a portion on which a specific color is indicated with a minimum density is referred to as a second portion. When a density value of the specific color indicated by the standard image data is more than or equal to a limit maximum density value at the first portion and less than or equal to a limit minimum density value at the second portion, the usability determining unit 102 may determine that the calibration chart is usable. Moreover, the usability determining unit 102 may exclude a case in which a difference between the density value at the first portion and the density value at the second portion is less than a limit density width from cases in which it is determined that the calibration chart is usable.

When such conditions are met with respect to each of a plurality of specific colors, the usability determining unit 102 may determine that the calibration chart is usable.

When it is determined that the calibration chart is usable, the standard sampling unit 103 records in the RAM 12, as standard sample data 12a, image values indicated by the standard image data for one or more prescribed positions) (hereinafter, referred to as sample points) on the calibration chart. The number of sample points can be set in accordance with accuracy required for the color calibration.

By transferring the standard image data to the printer device 18, the copy output unit 104 outputs the copy of the calibration chart through the printer device 18.

The comparison sampling unit 105 acquires, as comparison sample data, the image value at a position of the sample point of the comparison image data acquired by having the output copy scanned.

By comparing the standard sample data 12a with the comparison sample data, the calibration unit 106 performs color calibration.

To be more precise, the color calibration is a process of determining a conversion table and/or a conversion coefficient for converting various color data included in the image data to be acquired in the future by having the original document scanned into appropriate color data, in accordance with a difference between the standard sample data 12a and the comparison sample data. The color calibration is conventionally performed, and accordingly, a detailed description thereof is omitted.

Figure 5:
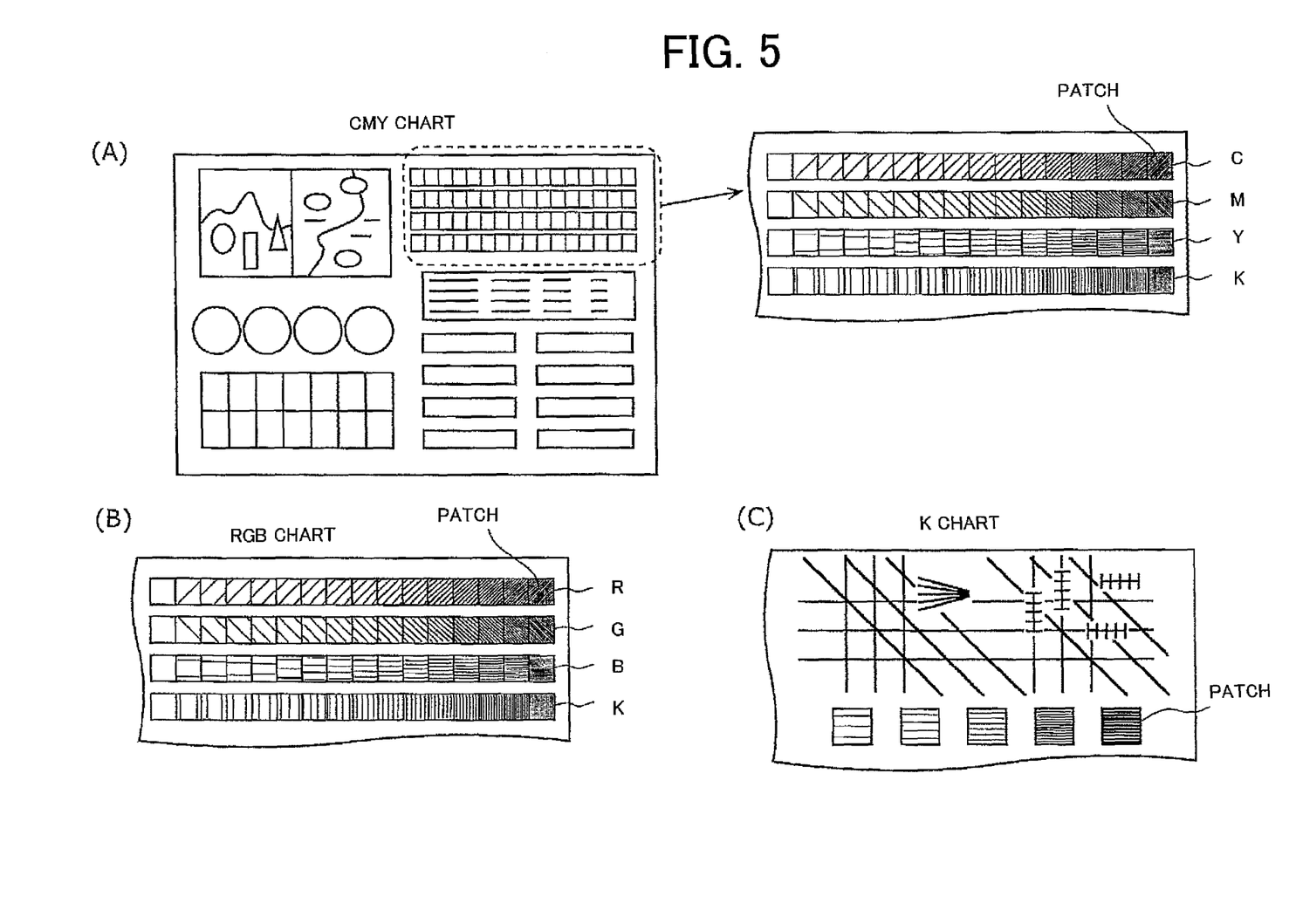
FIG. 5 illustrates a specific example of a calibration chart scanned by the image processing unit of FIG. 4.

FIG. 5 illustrates a specific example of the calibration chart scanned by the image processing unit 100. In FIGS. 5(A)-(C), the closer lines in each patch image are arranged to each other, the deeper the color becomes, and the farther the lines are arranged from each other, the lighter the color becomes.

FIG. 5(A) is a schematic view of an example of a Cyan-Magenta-Yellow (CMY) chart.

The CMY chart is a calibration chart used for a Cyan-Magenta-Yellow-Black (CMYK) color space, and is a printed material on which graphics and photographs etc. based on a CMYK are printed.

The right chart of FIG. 5(A) is an enlarged view of an area surrounded by a dotted frame in the left chart. As illustrated in the drawing, the patch images having each C, M, Y, and K as a base are aligned in rows, and the colors become deeper from left to right.

Moreover, for example, the deepest patch image at a right end of the C-based patch images can be used to determine a kind of the calibration chart.

FIG. 5(B) is a schematic view of a portion of a Red-Green-Blue (RGB) chart. To be more precise, FIG. 5(B) is an enlarged view of an area of the RGB chart corresponding to the area in the dotted frame of FIG. 5(A).

The RGB chart is a calibration chart for an RGB color space, and is a printed material on which graphics and photographs etc. based on an RGB are printed. The layout thereof is substantially similar to the CMY chart.

As illustrated in FIG. 5(b), patch images having each R, G, B, and K as a base are aligned in rows, and similarly to the CMY chart, the colors become deeper from left to right.

FIG. 5(C) is a schematic view of a portion of a K (Black) chart. To be more precise, FIG. 5(C) is an enlarged view of an area of the K chart corresponding to the area in the dotted frame of FIG. 5(A).

The K chart is a calibration chart for a multivalued image, and is a printed material on which graphics using only black ink are printed.

As illustrated in FIG. 5(c), K-based patch images are aligned in row, and similarly to the CMY chart, the colors become deeper from left to right.

The size of these calibration charts may be set, for example, to the A3 size. These are examples of calibration charts used for the color calibration performed by the image processing unit 100. Other color spaces, graphics and layouts may be used as long as each patch image and a target value correspond to each other.

The image processing unit 100 can scan each of these calibration charts, determine the usability thereof, and perform color calibration only when it is determined that the relevant calibration chart is usable.

Figure 6:
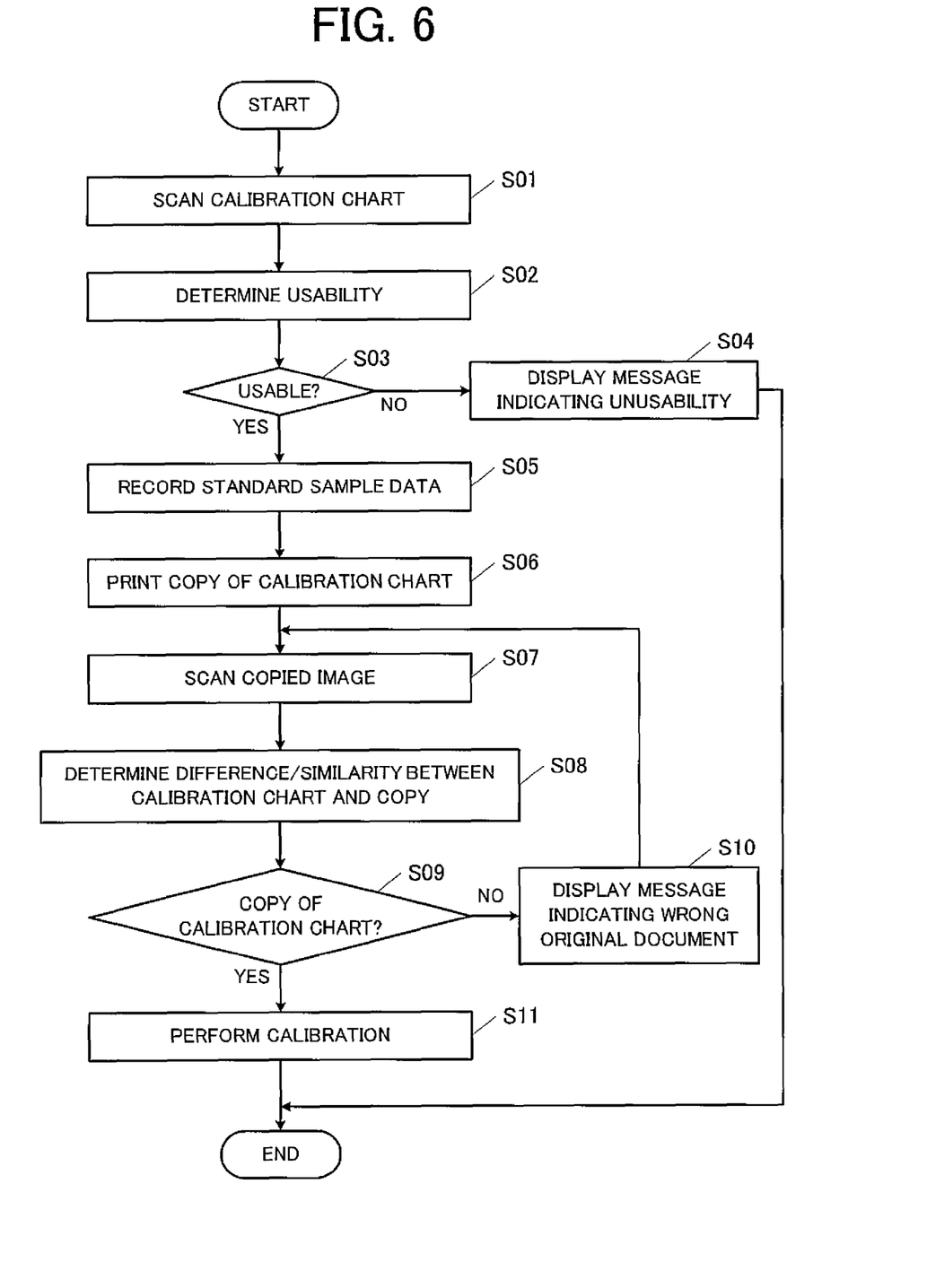
FIG. 6 is a flow chart illustrating a schematic operation of the image processing unit of FIG. 4.

With reference to FIGS. 6-9, the operations of the image processing unit 100 are described. FIG. 6 is a flow chart of a schematic operation of the image processing unit 100.

First, the scanning unit 101 scans the calibration chart to generate standard image data (S01).

Then, the usability determining unit 102 acquires usability condition data 11b stored in the ROM 11, and in accordance with the acquired usability condition data 11b, determines whether or not the standard image data can be used as the calibration chart (S02).

Figure 7:
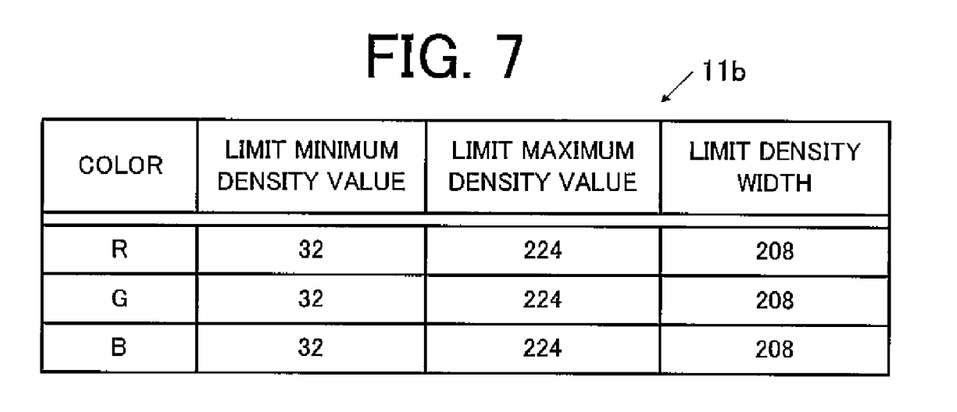
FIG. 7 illustrates an example of usability condition data.

FIG. 7 illustrates an example of the usability condition data 11b stored in the ROM 11.

The usability condition data 11b of FIG. 7 indicates that each limit minimum density value, limit maximum density value, and limit density width of R, G, and B, which are three specific colors of the RGB chart, are respectively "32", "224", and "208". In order to further determine the usability of the CMY chart and the K chart, the usability condition data 11b may include each limit minimum density value, limit maximum density value, and limit density width of C, M, Y, and K, which are other specific colors.

According to the example of the RGB chart, the usability determining unit 102 determines (1) whether or not the density value of R of the standard image data is, at the first portion where the deepest R-based patch image is indicated, more than or equal to the limit maximum density value of R of the usability condition data 11b; (2) whether or not the density value of R of the standard image data is, at the second portion where the lightest R-based patch image is indicated, less than or equal to the limit maximum density value of R of the usability condition data 11b; and (3) whether or not the difference between the density value of R of the standard image data at the first portion and the density value of R of the standard image data at the second portion is more than or equal to the limit density width of X of the usability condition data 11b.

The usability determining unit 102 performs a similar determination with respect to the G-based patch image and the B-based patch image. Then, when all the determinations are accepted, the usability determining unit 102 determines that the RGB chart is usable, and when one or more determination(s) is denied, the usability determining unit 102 determines that the RGB chart is not usable.

When the usability determining unit 102 determines that the RGB chart is not usable ("NO" in S03), the usability determining unit 102 displays an error message such as, for example, "this RGB chart is not usable", on the display 16, and ends the process (S04).

When the usability determining unit 102 determines that the RGB chart is usable ("YES" in S03), the standard sampling unit 103 records in the RAM 12 as the standard sample data 12a, the image value of the standard image data at a predetermined sample point on the calibration chart (S05).

Figure 8:
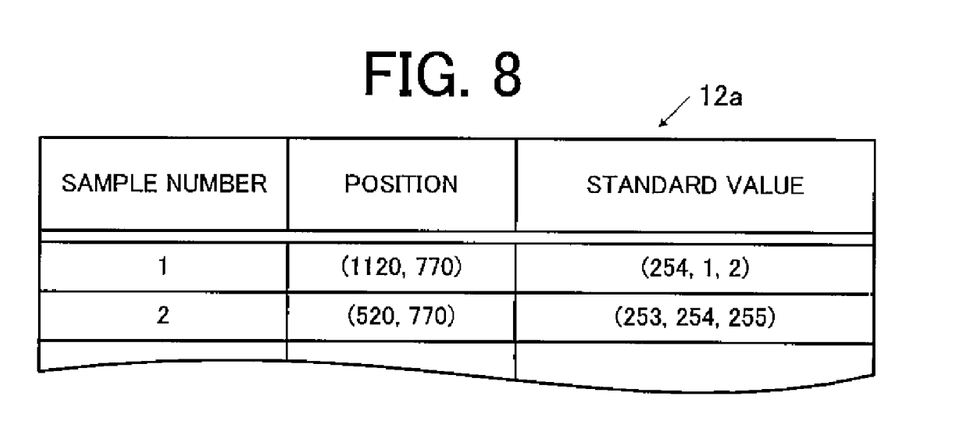
FIG. 8 illustrates an example of standard sample data.

FIG. 8 illustrates an example of standard sample data 12a recorded in the RAM 12. In FIG. 8, the standard sample data of sample number 1, for example, shows a coordinate (1120, 770) of a center position of the deepest patch image in the R-based row of the RGB chart and the image values (254, 1, 2) of the standard image data at the center position. The standard sample data of sample number 2 shows a coordinate (520, 770) of a center position of the lightest patch image in the R-based row of the RGB chart and the image values (253, 254, 255) of the standard image data at the center position.

A standard value is represented by a coordinate value in a well-known color space for specifying colors (including black and white tone). The standard value is, for example, represented by a coordinate value in an RGB color space or a CMY color space. Moreover, for example, the standard value may be represented by a coordinate value in an LAB color space in which colors are represented by three values: lightness (brightness) index (L); perceptual chromaticity (A); and perceptual chromaticity (B), or may be represented by a coordinate value in a YCC color space including a luminance signal (Y) and two color-difference signals (Cr and Cb).

Next, by transferring the standard image data to the printer device 18, the copy output unit 104 outputs the copy of the calibration chart through the printer device 18 (S06).

The copy of the calibration chart output from the printer device 18 is transported by the user and scanned by the scanner device 17.

The scanning unit 101 scans the copy of the calibration chart to generate comparison image data (S07).

The comparison sampling unit 105 acquires, as the comparison sample data, the image value of the comparison image data at a position of each sample point recorded in the standard sample data 12a (S05).

Figure 9:
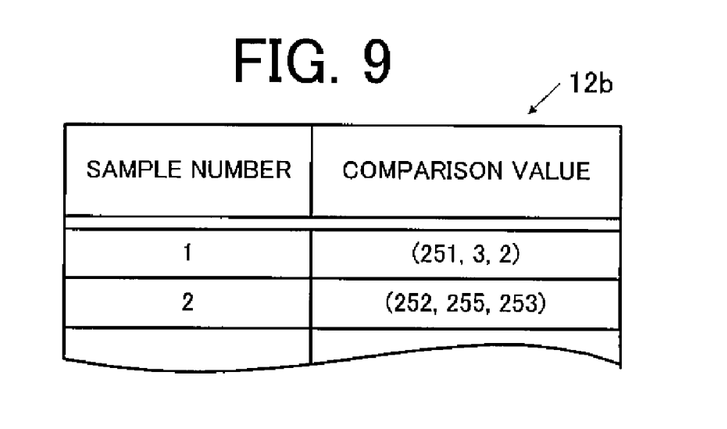
FIG. 9 illustrates an example of comparison sample data.

FIG. 9 illustrates an example of comparison sample data. In FIG. 9, image values of the comparison image data at the position of each sample point of the standard sample data 12a of FIG. 8 are shown as comparison values.

When a difference between one standard value and a comparison value corresponding thereto exceeds a predetermined threshold value, the comparison sampling unit 105 determines that the scanned original document is not the copy of the calibration chart ("NO" in S09), displays an error message such as, for example, "this original document is not the copy of the calibration chart" on the display 16, and retries the scanning of the copy (S10).

When the difference between each standard value and the comparison data corresponding thereto is less than or equal to the predetermined threshold value, the comparison sampling unit 105 determines that the scanned original document is the copy of the calibration chart ("YES" in S09), and by comparing the standard sample data with the comparison sample data, the calibration unit 106 performs color calibration (S11).

As described above, when performing color calibration, since the network multifunction peripheral 1 of this embodiment determines by itself whether or not the calibration chart is usable, expensive measuring instruments conventionally required for such a determination are not necessary. As a result, even a general user can easily know if the calibration chart is usable.

An embodiment of an image processing device of the present invention has been described, however, the present invention is not limited to this embodiment. Various modifications and changes may be made without departing from the scope of the present invention.

For example, while the standard value of the standard sample data 12a has been described as the image value at the center position of the patch image, the image value may alternatively be calculated by statistically processing a plurality of pixel values included in the area of the patch image. To be more precise, in a histogram of a plurality of pixel values, when only pixel values included in a predetermined scope from a median are averaged, a preferable standard value with the effect of noise reduced can be acquired.

Further, before determining whether or not the calibration chart is usable, it can be determined whether or not the scanned calibration chart is proper.

For example, when performing color calibration using the RGB chart, if the user erroneously scans the CMY chart, it can be considered that the pixel value indicating a color completely different from the red expected at the position of the deepest patch image in the R-based row is acquired.

Accordingly, by maintaining in advance data indicating the scope of pixel value that can be permitted at the predetermined position, when the image value at the predetermined position of the standard image data acquired by scanning the calibration chart is outside the permitted scope, it can be determined that a wrong calibration chart has been scanned.

When it is determined that the wrong calibration chart has been scanned, an error message such as "this original document is not the right calibration chart", for example, is displayed on the display 16, and the process is ended. Thus, the user can be easily notified, before the determination is made as to whether or not the calibration chart is usable, that another problem has occurred.

As an image processing apparatus that processes image data acquired by optically scanning an original document, the present invention can be applied, for example, to a network multifunction peripheral, a scanner device or the like.

While the present invention has been described with respect to embodiments thereof, it will be apparent to those skilled in the art that the invention may be modified in numerous ways and may assume many embodiments other than those specifically set out and described above. Accordingly, the appended claims cover all modifications that fall within the true spirit and scope of the present invention.

What is claimed is:

1. An image processing apparatus comprising:
   a usability determining unit that determines, in accordance with conditions for colors indicated by standard image data acquired by scanning an original document, whether or not the original document is usable as a calibration chart; and
   a calibration unit that performs, only when the determination is made that the original document is usable as the calibration chart, color calibration by using an image value at a predetermined position indicated by the standard image data,
   wherein when a density value of a specific color indicated by the standard image data is more than or equal to a limit maximum density value at a first portion and less than or equal to a limit minimum density value at a second portion, the usability determining unit determines that the calibration chart is usable.

2. The image processing apparatus according to claim 1, wherein the usability determining unit excludes a case in which a difference between the density value at the first portion and the density value at the second portion of the specific color indicated by the standard image data is less than a limit density width, and determines that the calibration chart is usable.

3. The image processing apparatus according to claim 2 further comprising:
   a standard sampling unit that records, as standard sample data, the image value at the predetermined position indicated by the standard image data;
   a copy output unit that outputs to a printer device a copy of the original document indicated by the standard image data; and
   a comparison sampling unit that acquires, as comparison sample data, the image value at the predetermined position indicated by comparison image data acquired by scanning the output copy, wherein
   the calibration unit performs the color calibration by comparing the standard sample data with the comparison sample data.

4. The image processing apparatus according to claim 3, wherein the standard sample data and the comparison sample data comprise image values at center positions of patch images.

5. The image processing apparatus according to claim 3, wherein the standard sample data and the comparison sample data are calculated by statistically processing a plurality of pixel values included in areas of patch images.

6. A network multifunction peripheral that delivers at least one of a copying function, a network scanner function, and a network printer function by transferring image data acquired by optically scanning an original document to at least one of a built-in printer device, and a terminal device and a printer device connected thereto through a network, the network multifunction peripheral comprising:
   a usability determining unit that determines, in accordance with conditions for colors indicated by standard image data acquired by scanning the original document, whether or not the original document is usable as a calibration chart; and
   a calibration unit that performs, only when the determination is made that the original document is usable as the calibration chart, color calibration by using an image value at a predetermined position indicated by the standard image data,
   wherein when a density value of a specific color indicated by the standard image data is more than or equal to a limit maximum density value at a first portion and less than or equal to a limit minimum density value at a second portion, the usability determining unit determines that the calibration chart is usable.

7. The network multifunction peripheral according to claim 6, wherein the usability determining unit excludes a case in which a difference between the density value at the first portion and the density value at the second portion of the specific color indicated by the standard image data is less than a limit density width, and determines that the calibration chart is usable.

8. The network multifunction peripheral according to claim 7, further comprising:
   a standard sampling unit that records, as standard sample data, the image value at the predetermined position indicated by the standard image data;

a copy output unit that outputs to a printer device a copy of the original document indicated by the standard image data; and a comparison sampling unit that acquires, as comparison sample data, the image value at the predetermined position indicated by comparison image data acquired by scanning the output copy, wherein the calibration unit performs the color calibration by comparing the standard sample data with the comparison sample data.

9. The network multifunction peripheral according to claim 8, wherein the standard sample data and the comparison sample data comprise image values at center positions of patch images.

10. The network multifunction peripheral according to claim 8, wherein the standard sample data and the comparison sample data are calculated by statistically processing a plurality of pixel values included in areas of patch images.

11. An image processing method comprising:
   determining, in accordance with conditions for colors indicated by standard image data acquired by scanning an original document, whether or not the original document is usable as a calibration chart;
   performing, only when the determination is made that the original document is usable as the calibration chart, color calibration by using an image value at a predetermined position indicated by, the standard image data; and
   determining, when a density value of a specific color indicated by the standard image data is more than or equal to a limit maximum density value at a first portion and less than or equal to a limit minimum density value at a second portion, that the calibration chart is usable.

12. The image processing method according to claim 11, further comprising:
   excluding a case in which a difference between the density value at the first portion and the density value at the second portion of the specific color indicated by the standard image data is less than a limit density width, and determining that the calibration chart is usable.

13. The image processing method according to claim 12, further comprising:
   recording, as standard sample data, the image value at the predetermined position indicated by the standard image data;
   outputting to a printer device a copy of the original document indicated by the standard image data; and
   acquiring, as comparison sample data, the image value at the predetermined position indicated by comparison image data acquired by scanning the output copy, wherein
   the color calibration is performed by comparing the standard sample data with the comparison sample data.

14. The image processing method according to claim 11, and further comprising:
   before determining whether or not the original document is usable as a calibration chart, determining whether or not the scanned original document is a proper calibration chart.

15. The image processing method according to claim 14, wherein whether the scanned original document is a proper calibration chart is determined by:
   storing in advance data indicating a permitted scope of pixel values that can be permitted at predetermined positions; and
   determining, when an image value at a predetermined position is outside the permitted scope, that a wrong calibration chart has been scanned.

16. A computer program embodied in a non-transitory computer-readable medium that executes the image processing method according to claim 14.

* * * * *